Aug. 8, 1933.   L. F. KOSS, JR   1,921,758
VARIABLE SPEED DRIVE
Filed March 21, 1932   3 Sheets-Sheet 1
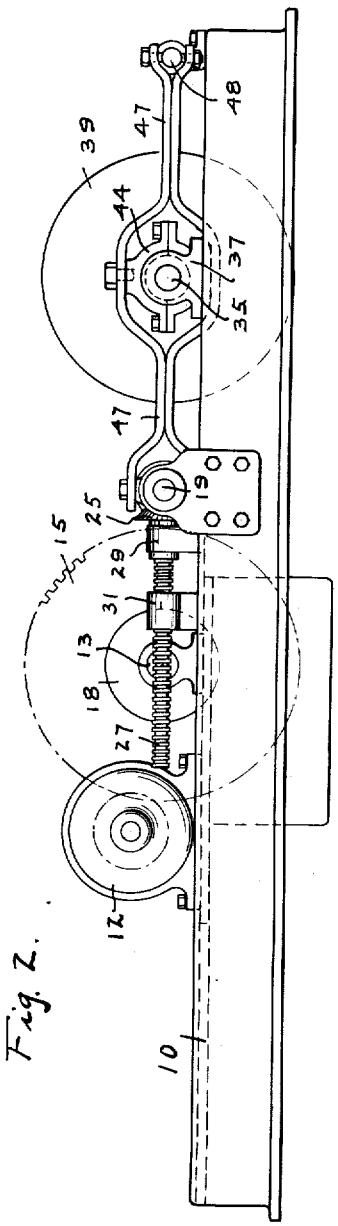
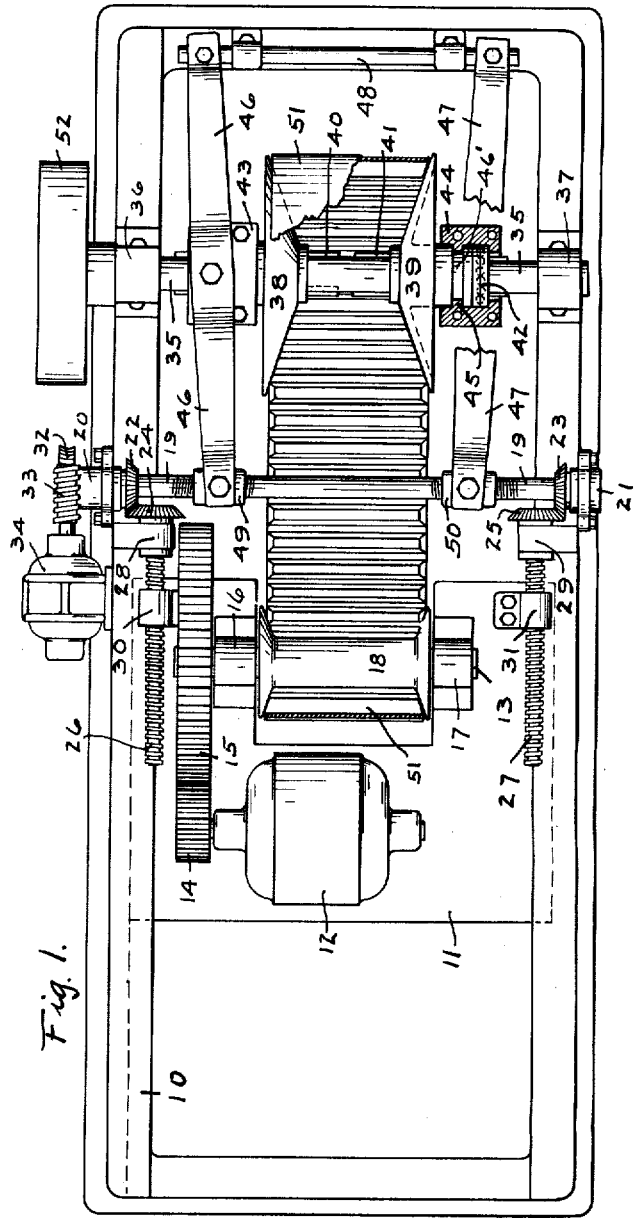
Inventor,
Louis F. Koss, Jr.,
By Minturn & Minturn,
Attorneys.

Aug. 8, 1933.  L. F. KOSS, JR  1,921,758
VARIABLE SPEED DRIVE
Filed March 21, 1932  3 Sheets-Sheet 2
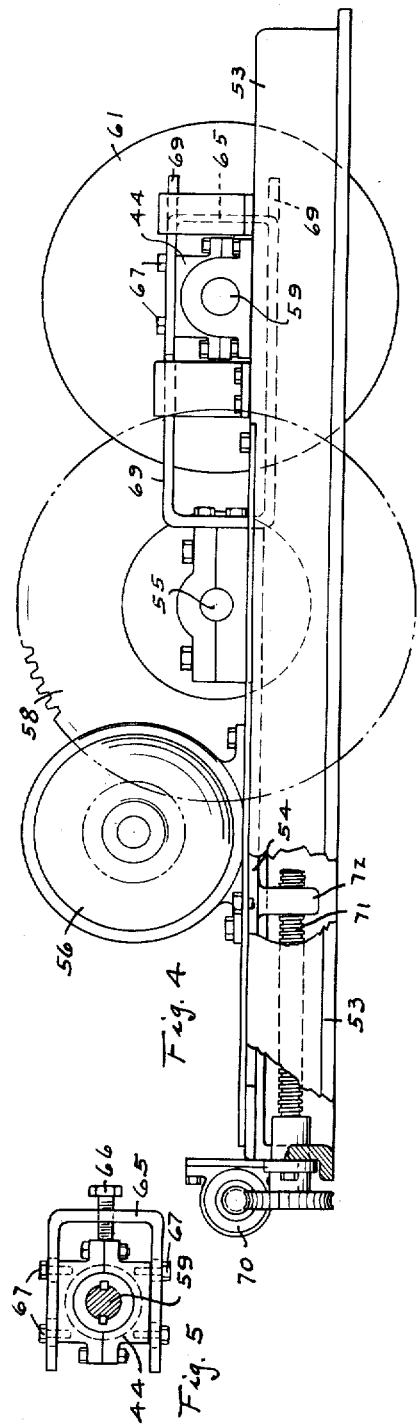
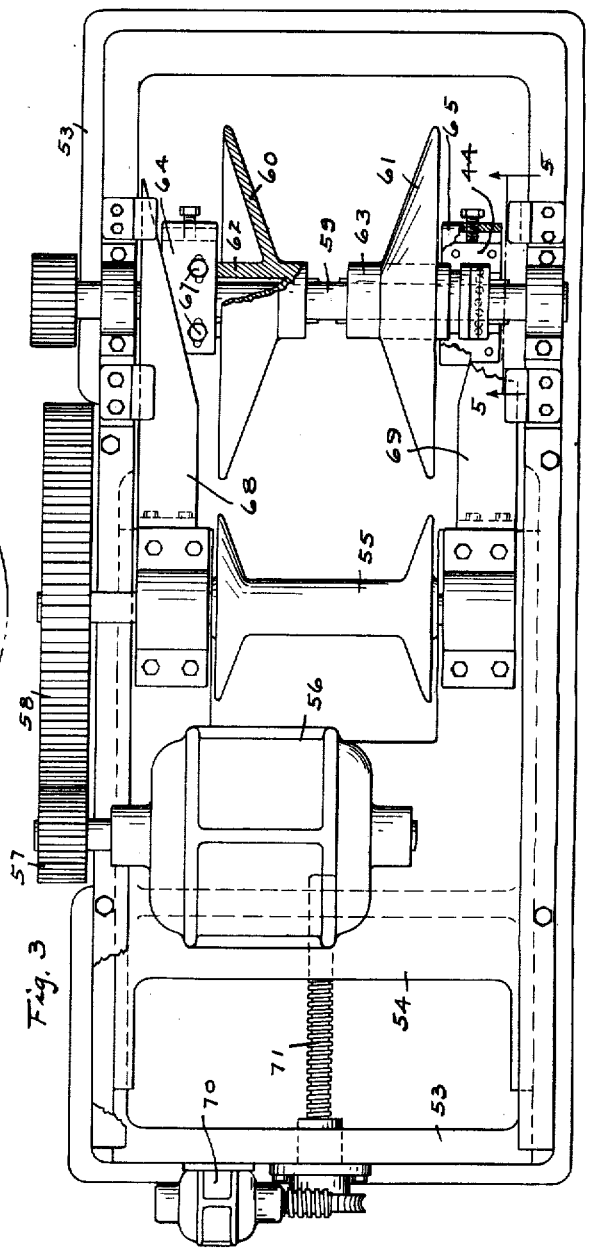
Inventor
Louis F. Koss Jr.,
By Minturn & Minturn
Attorneys.

Aug. 8, 1933.   L. F. KOSS, JR   1,921,758
VARIABLE SPEED DRIVE
Filed March 21, 1932   3 Sheets-Sheet 3
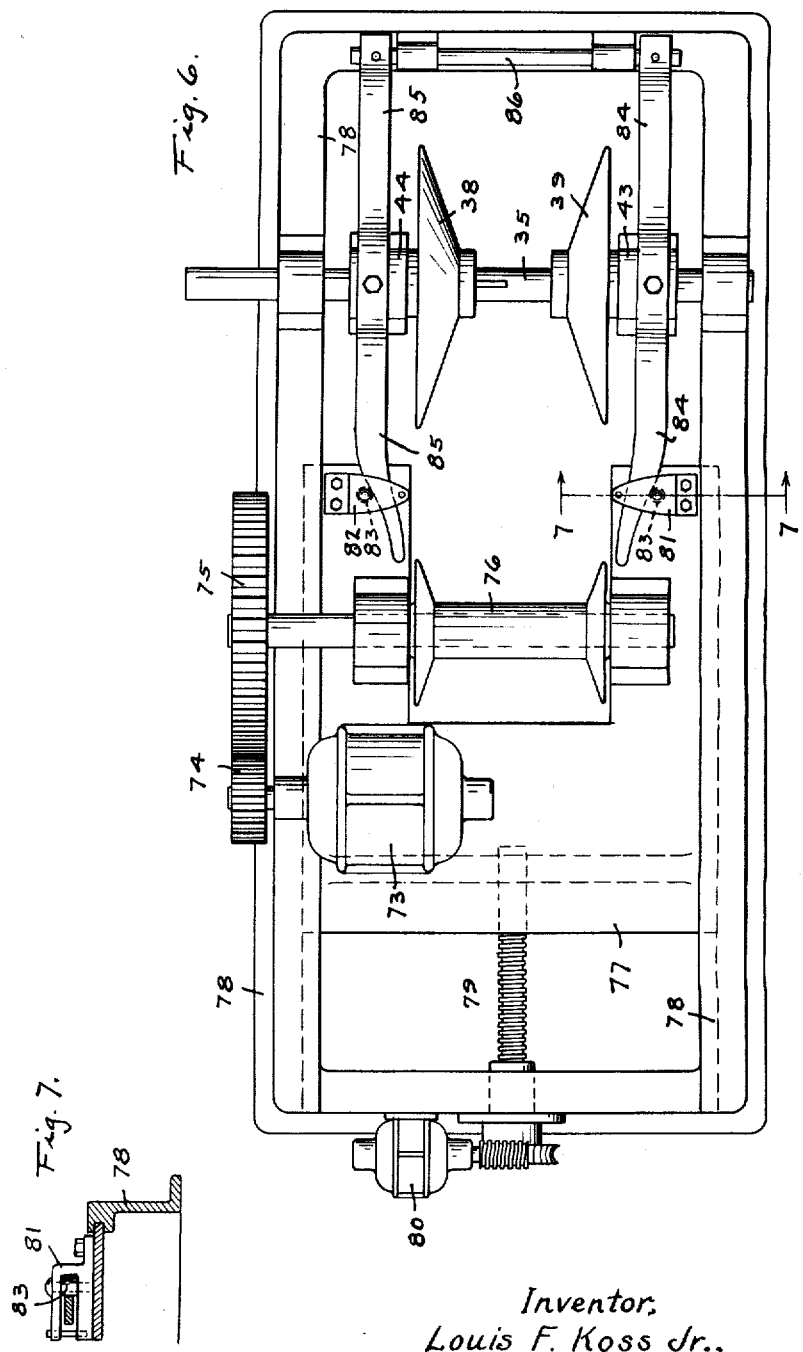
Inventor,
Louis F. Koss Jr.,
By Minturn & Minturn,
Attorneys.

Patented Aug. 8, 1933　　1,921,758

UNITED STATES PATENT OFFICE 1,921,758

VARIABLE SPEED DRIVE

Louis F. Koss, Jr., Indianapolis, Ind., assignor to Capital Machine Company, Indianapolis, Ind., a Corporation Application March 21, 1932. Serial No. 600,221

9 Claims. (Cl. 64—8)

This invention relates to the art of variable speed drives particularly of the type employing a pair of opposed cones which may be shifted in relation to each other in order to permit a belt running therebetween to travel about varying circumferences thereof.

A primary object of the invention is to provide a simple compact form of mechanism capable of transmitting a relatively large amount of power. A further primary object of the invention is to provide a single pair of shiftable cones and to provide means for automatically and simultaneously taking up or letting out the belt as the cones may be shifted toward and away from each other whereby a uniform belt tension is maintained from a single point of control. An advantage of the invention is that the structure embodying it may be made at a relatively low cost in comparison with other types of variable speed drives. Other advantages will become apparent in the following description of the invention as illustrated by the accompanying drawings, in which Fig. 1 is a fragmentary top plan view of a structure embodying the invention;

Fig. 2, a side elevation;

Fig. 3, a fragmentary top plan view of a modified form of the invention;

Fig. 4, a fragmentary side elevation of the modified form;

Fig. 5, a detail in section on the line 5—5 in Fig. 3;

Fig. 6, a top plan view of a still further modified form of the invention, and

Fig. 7, a detail in transverse section on the line 7—7 in Fig. 6.

Like characters of reference indicate like parts throughout the several views in the drawings.

Referring first to Figs. 1 and 2, I form a bed 10 on one end of which is slidably carried a platform 11 to be shiftable longitudinally of the bed. A motor 12 is mounted on this platform 11 and is connected to a transverse shaft 13 through the gears 14 and 15. The shaft 13 is revolubly carried by the platform 11 by spaced apart bearings 16 and 17 between which is mounted a spool 18 to be revolved with the shaft 13. A transverse shaft 19 is mounted transversely across the bed 10 to be carried revolubly by the bearings 20 and 21 which prevent longitudinal shifting of the shaft. Beveled gears 22 and 23 are mounted adjacent the bearings 20, 21 respectively and are in constant mesh with the mating gears 24 and 25. These gears 24 and 25 are respectively fixed on the ends of threaded shafts 26 and 27 which shafts are revolubly supported but are held against longitudinal displacement by the bearings 28 and 29 which are mounted on the bed 10. The shafts 26 and 27 extend from these bearings and screwthreadedly pass through brackets 30 and 31 respectively, which brackets are fixed to the platform 11. One of the shafts 26 and 27 has a left hand thread while the other has a right hand thread so that upon the revolving of the transverse shaft 19, the shafts 26 and 27 will be revolved to move the platform 11 along on the bed 10 in a direction depending upon the direction of rotation of the shaft 19. On one of the outer ends of the shaft 19 outside of the bearing 20 is mounted a worm wheel 32 and a worm 33 is meshed with this wheel 32 and driven from a motor 34 here shown as being attached to the side of the bed 10. This motor 34 is of the reversible type and is employed to turn the shaft 19 in either direction of rotation as may be desired.

Ahead of the shaft 19 is a driven shaft 35 revolubly mounted transversely of the bed 10 to be carried through the bearings 36 and 37 thereon. A pair of opposing cones 38 and 39 are mounted on this shaft 35 by sleeves integral with the cones slidably fitted on the shaft. Circumferential travel of the sleeves around the shaft 35 is prevented by means of the keys 40, 41 fitted in the shaft and extending into the sleeves in such manner that while the sleeves are thus keyed to the shaft the sleeves may be moved longitudinally therealong. The outer end of each of the sleeves has a thrust bearing 42 disposed against the end of the sleeve and surrounding the shaft 35 to be carried within the split housings 43 and 44 respectively. Each of these housings is provided with a ring 45 extending to within an annular groove 46' formed in the sleeve whereby the sleeve may be shifted along the shaft 35 by moving the housing and the outward thrust of the sleeve will be against the bearing 42 within the housing.

A pair of arms 46 and 47 have their outer ends pivotally secured in spaced apart relation on the ends of a bar 48 which is carried by the bed 10. These arms 46, 47 extend from the ends of this bar 48 across and pivotally engage the respective housings 43, 44, here shown as straddling the housings above and below and have their rear ends pivotally secured to the nuts 49, 50 which are screwthreadedly carried on the shaft 19, one of the nuts being provided with left hand threads and the other with right hand threads whereby revolution of the shaft 19 will carry the nuts toward or away from each other depending upon the direction of rotation of the shaft. A suitable belt 51 preferably endless is passed around the spool 18 and between the cones 38 and 39. This belt is provided with closely spaced blocks which bear by their outer ends against the inner faces of the flanges on the spool 18 and against the conical faces of the cones 38 and 39. It is to be seen that by varying the spacing apart of the cones 38 and 39 one from the other along the shaft 35, the ends of these blocks on the belt 51 may have their lines of contact with the faces of the cones varied inwardly and outwardly from the shaft 35 and accordingly the number of revolutions per minute of the shaft 35 may be varied with a fixed rate of rotation of the spool 18. The outer end of the driven shaft 35 is here shown as being provided with a pulley 52 as a power take-off. To vary the speed of the pulley 52 the adjusting motor 34 may be set in operation to run in that direction as desired for a higher or lower rate of speed and the shaft 19 will be correspondingly revolved to simultaneously shift the rear ends of the levers 46 and 47 to change the spacing apart of the cones 38 and 39 and also to shift the platform 11 along the bed 10 to change the distance between the spool 18 and the shaft 35 to maintain a uniform tension on the belt by taking up the slack therein as the cones may be spread apart or letting the belt move forwardly as the cones are brought closer together.

The same results may be obtained by employing the modified form of the structure as illustrated in Figs. 3—5 of the drawings wherein a base or bed 53 carries a motor platform 54 slidably thereon toward its rear end and has a spool 55 mounted transversely across the forward end of this platform to be revolved by the motor 56 through the reduction gears 57 and 58. The driven shaft 59 is mounted transversely across the forward part of the bed 53 and carries thereon the opposing cones 60 and 61 which are mounted on the shaft 59 by the sleeves 62 and 63, which sleeves are free to slide longitudinally of the shaft but are keyed thereto to prevent rotation therearound. The same housings 43 and 44 are provided on the outer ends of the sleeves 62 and 63 as are employed in the form first above described. These housings 43 and 44 however have the U-shaped brackets 64 and 65 slipped thereover and held in place by the cap screws 67 passed through the top and bottom legs of the brackets screwthreadedly into the housings. The screws pass through slots in the brackets so that the brackets may be shifted forwardly and rearwardly of the housings and located in any desired position thereover by the set screws 66 passing through the vertical bars between the legs of the brackets to bear against the forward sides of the housings. These brackets have the outer edges of the legs beveled to slope inwardly and rearwardly. On the forward end of the platform 54 are mounted the shifting arms 68 and 69. These arms are held rigidly in place and have inner beveled edges to slide against the beveled edges of the brackets 64 and 65, in such a manner that as the platform 54 is moved toward the shaft 59, these brackets by sliding along the sides of the brackets 64 and 65 will push the brackets inwardly to correspondingly shift the cones 60 and 61 toward each other. Upon moving the platform 54 rearwardly the cones 60 and 61 may be shifted outwardly along the shaft 59 as the arms move rearwardly. The taper on the inner sides of the arms 68 and 69 corresponds to that on the outer sides of the brackets 64 and 65 and is correlated with the angularity of the cones 60 and 61 so that a uniform tension on the belt which may be wrapped around the spool 55 and between the cones 60 and 61 is automatically maintained as the platform 54 may be shifted and the cones 60 and 61 moved toward or away from each other during that shifting.

In this modified form a motor 70 is mounted on the bed 53 to revolve a screw shaft 71 extending longitudinally of the bed to screwthreadedly engage with a member 72 fixed to the platform 54. This motor 70, being of the reversible type, is employed to shift the platform 54 forwardly or rearwardly in order to effect the desired speed change.

A still further modified form of the invention is illustrated in Figs. 6 and 7 of the drawings in which a motor drive unit comprising the motor 73, reduction gears 74 and 75, and the driving spool 76, is mounted on the platform 77 which is slidably guided longitudinally of the bed 78. This platform 77 may be shifted forwardly and rearwardly by means of the screw shaft 79 which is revolved by the motor 80. On the forward end of the platform 77 are mounted two brackets 81, 82 which have vertically disposed rollers 83 against which the outer sides of the shifting arms 84 and 85 may bear. These arms 84 and 85 are pivotally mounted at the forward end of the bed 78 on the respective ends of the bar 86 and extend rearwardly therefrom to engage with the bearing housings 43 and 44 and to extend on therebeyond to pass on the inner sides of the rollers 83. These housings 43 and 44 are revolubly fixed on the ends of the sleeves of the cones 38 and 39 in the same manner as above described in reference to the form illustrated in Fig. 1. The rear ends of the arms 84 and 85 are sloped inwardly so that as the platform 77 may be moved forwardly the rear ends of the arms 84 and 85 will be pushed toward each other by reason of the rollers 83 traveling thereagainst. Pressure of a belt between the cones 38 and 39 will tend to spread the cones apart and keep the arms in contact with the rollers 83. Thus by shifting the platform 77 forwardly the cones 38 and 39 are automatically shifted toward each other a distance corresponding to the forward travel of the spool 76 which will maintain a uniform tension on the belt that may be wrapped therearound and upon shifting the platform 77 rearwardly the cones 38 and 39 are allowed to spread apart under the pull of the belt to the same proportionate distance in comparison with the travel of the spool 76.

It is thus to be seen that in any or all of the above forms of the invention shown and described, the driving member is automatically and simultaneously shifted upon varying the spacing between the driven cones and no other auxiliary shifting or belt tensioning device is required, and, while I have here shown my invention in the best forms as now known to me, it is obvious that structural variations may be made without departing from the spirit of the invention and I, therefore, do not desire to be limited to any one of those forms beyond the limitations as may be imposed by the following claims.

I claim:

1. In a variable speed drive, a bed, a motor driving unit having a driving spool, a platform shiftable along the bed, a driven shaft, a pair of opposing cones on the driven shaft fixed to revolve therewith but slidable longitudinally therealong, a belt wrapped around said spool and between said cones adapted to be driven by said spool and to turn said driven shaft through said cones, and means for shifting said platform along the bed toward or away from said driven shaft and simultaneously shifting said cones toward or away from each other to maintain a constant belt tension as the line of belt contact around said cones may vary outwardly and inwardly from the driven shaft during said shifting, said means comprising a reversible motor, means for moving the platform by the operation of the motor in corresponding opposite directions and means actuated by the movement of the platform to change the speed and to keep the belt suitably tight.

2. In a variable speed drive, a bed, a motor driving unit having a driving spool, a platform shiftable along the bed, a driven shaft, a pair of opposing cones on the driven shaft fixed to revolve therewith but slidable longitudinally therealong, a belt wrapped around said spool and between said cones adapted to be driven by said spool and to turn said driven shaft through said cones, and means for shifting said platform along the bed toward or away from said driven shaft and simultaneously shifting said cones toward or away from each other to maintain a constant belt tension as the line of belt contact around said cones may vary outwardly and inwardly from the driven shaft during said shifting, said means comprising a reversible motor, a screw shaft driven by the motor and engaging said platform, and arms engaging members connected with said cones, said arms being shifted through movement of the platform to space the cones in the required proportion to give the desired speed change and maintain the belt tension.

3. In a variable speed drive, a bed, a motor driving unit having a driving spool, a platform shiftable along the bed, a driven shaft, a pair of opposing cones on the driven shaft fixed to revolve therewith but slidable longitudinally therealong, a belt wrapped around said spool and between said cones adapted to be driven by said spool and to turn said driven shaft through said cones, and means for shifting said platform along the bed toward or away from said driven shaft and simultaneously shifting said cones toward or away from each other to maintain a constant belt tension as the line of belt contact around said cones may vary outwardly and inwardly from the driven shaft during said shifting, said means comprising a pair of arms pivotally secured by their forward ends to said bed, thrust bearing housings connected with said cones, said arms extending rearwardly from their pivot points to engage said housings, and arm shifting members shiftable by said motor in timed sequence with the shifting of said platform whereby the degree of lateral shifting of the cones and longitudinal shifting of said spool are correlated to maintain said belt tension.

4. In a variable speed belt drive, a bed, a motor driving unit having a driving spool, a platform supporting said unit shiftable along the bed, a driven shaft revolubly carried at fixed points on the bed transversely to the direction of shifting of said platform, a pair of opposed cones on said driven shaft fixed to revolve therewith but slidable longitudinally thereof, thrust bearing housings connected with the cones, tapered surfaces carried by the housings, a pair of arms carried by said platform having tapered surfaces bearing against the tapered surfaces on the housings, and a screw shaft for shifting said platform, said tapered surfaces being shaped to shift said cones to the required distance apart in accordance with the shifting of the driving spool to maintain a constant tension of a belt that may extend around said spool and said cones.

5. In a variable speed belt drive, a bed, a motor driving unit having a driving spool, a platform supporting said unit shiftable along the bed, a driven shaft revolubly carried at fixed points on the bed transversely to the direction of shifting of said platform, a pair of opposed cones on said driven shaft fixed to revolve therewith but slidable longitudinally thereof, thrust bearing housings connected with the cones, tapered surfaces carried by the housings, a pair of arms carried by said platform having tapered surfaces bearing against the tapered surfaces on the housings, and a screw shaft for shifting said platform, said tapered surfaces being shaped to shift said cones to the required distance apart in accordance with the shifting of the driving spool to maintain a constant tension of a belt that may extend around said spool and said cones, said housings being located on the outer sides of the cones, and brackets carried by the housings and having said housing carried surfaces on the inner sides thereof sloping inwardly and toward said spool, each of said brackets being shiftable on its supporting housing to permit individual initial spacing apart of the cones.

6. In a variable speed drive, a bed, a motor unit having a driving spool disposed transversely of the bed, a platform carrying the unit and spool shiftable longitudinally of the bed, a driven shaft revolubly carried forwardly of the spool transversely across the bed to have its axis fixed in respect to the axis of said spool, a pair of opposing cones carried by the driven shaft to be fixed thereon to revolve the shaft but slidable longitudinally thereof, thrust bearing carriers on the outer sides of the cones, a pair of arms pivotally supported by their forward ends of said bed forwardly of said driven shaft, said arms extending rearwardly across said carriers to be engaged therewith and to have inwardly sloping outer edges toward their rear ends beyond said cones, arm contacting members carried by said platform adapted to contact with said sloping edges, and means for shifting said platform, the degree of slope of said arm edges having a definite correlation with the rate of travel of said platform whereby, as the platform may be shifted forwardly to cause said arms to be pulled toward each other or backwardly to allow the arms to spread apart and thus determine the spacing apart of said cones, said spool is shifted to maintain a constant tension on the belt passed around the spool and cones as the driven shaft speed is changed.

7. In a variable speed belt drive, a bed, a motor driving unit having a belt driving spool disposed transversely of the bed, a platform carrying the unit and spool shiftable along the bed, a driven shaft mounted on the bed forwardly of the platform to have its axis parallel and fixed in relation to the axis of the spool, a pair of opposing cones keyed to and shiftable longitudinally along the driven shaft, a pair of arms each having its forward end pivotally supported by said bed forwardly of the driven shaft and extending rearwardly past the outer side of the respective cone and rockably engaged therewith whereby the shifting of the rear ends of the arms will cause the cones to be shifted longitudinally of the driven shaft, a transverse shifting shaft carried by the bed adjacent the rear ends of said arms, a left hand nut and a right hand nut each screwthreadedly engaging left and right hand threads on the shifting shaft, the rear ends of said arms being engaged with said nuts, a screw shaft drivingly connected with said shifting shaft, said screw shaft screwthreadedly engaging a member fixed to the platform, and means for revolving said shifting shaft whereby changing of the spacing between the cones on the driven shaft through shifting of said arms causes a simultaneously correlated shifting of said platform to correspondingly change the distance between the driving spool and the driven shaft.

8. In a variable speed belt drive, a bed, a motor driving unit having a driving spool, a platform supporting said unit shiftable along the bed, a driven shaft revolubly carried at fixed points on the bed transversely to the direction of the shifting of said platform, a pair of opposed cones on said driven shaft fixed to revolve therewith but slidable longitudinally thereof, thrust bearing members connected with the cones, a pair of arms carried by said platform having cam surfaces, cam surface contacting members carried by said bearing members, and means for shifting said platform, said cam surfaces being shaped to maintain said cones the required distance apart in coordination with the shifting of the driving spool so as to maintain a constant tension of a belt extending around said spool and said cones.

9. In a variable speed drive, a bed, a motor driving unit shiftable on said bed and having a flanged driving spool, a driven shaft fixed relative to said unit, a pair of opposing cones on the shaft each fixed to revolve therewith but slidable longitudinally therealong, an edge contacting belt wrapped around said spool and between edge contact with the flanges of said cones adapted to be driven by said spool to turn said driven shaft through said cones, means for shifting said unit toward and away from said driven shaft, and positive cone spacing members shifted by movement of said unit retaining said cones in predetermined spaced apart rigid positions in coordination with the shifting of said unit whereby a uniform belt tension is maintained at all positions of said unit independently of an idler pulley.

LOUIS F. KOSS, JR.

CERTIFICATE OF CORRECTION.

Patent No. 1,921,758.  August 8, 1933.

LOUIS F. KOSS, JR.

It is hereby certified that error appears in the printed specification of the above numbered patent requiring correction as follows: Page 4, line 90, claim 9, strike out the words "edge contact with the flanges of" and insert the same before "said" first occurrence in line 91; and that the said Letters Patent should be read with this correction there in that the same may conform to the record of the case in the Patent Office.

Signed and sealed this 29th day of August, A. D. 1933.

M. J. Moore.

(Seal)  Acting Commissioner of Patents.

whereby the shifting of the rear ends of the arms will cause the cones to be shifted longitudinally of the driven shaft, a transverse shifting shaft carried by the bed adjacent the rear ends of said arms, a left hand nut and a right hand nut each screwthreadedly engaging left and right hand threads on the shifting shaft, the rear ends of said arms being engaged with said nuts, a screw shaft drivingly connected with said shifting shaft, said screw shaft screwthreadedly engaging a member fixed to the platform, and means for revolving said shifting shaft whereby changing of the spacing between the cones on the driven shaft through shifting of said arms causes a simultaneously correlated shifting of said platform to correspondingly change the distance between the driving spool and the driven shaft.

8. In a variable speed belt drive, a bed, a motor driving unit having a driving spool, a platform supporting said unit shiftable along the bed, a driven shaft revolubly carried at fixed points on the bed transversely to the direction of the shifting of said platform, a pair of opposed cones on said driven shaft fixed to revolve therewith but slidable longitudinally thereof, thrust bearing members connected with the cones, a pair of arms carried by said platform having cam surfaces, cam surface contacting members carried by said bearing members, and means for shifting said platform, said cam surfaces being shaped to maintain said cones the required distance apart in coordination with the shifting of the driving spool so as to maintain a constant tension of a belt extending around said spool and said cones.

9. In a variable speed drive, a bed, a motor driving unit shiftable on said bed and having a flanged driving spool, a driven shaft fixed relative to said unit, a pair of opposing cones on the shaft each fixed to revolve therewith but slidable longitudinally therealong, an edge contacting belt wrapped around said spool and between edge contact with the flanges of said cones adapted to be driven by said spool to turn said driven shaft through said cones, means for shifting said unit toward and away from said driven shaft, and positive cone spacing members shifted by movement of said unit retaining said cones in predetermined spaced apart rigid positions in coordination with the shifting of said unit whereby a uniform belt tension is maintained at all positions of said unit independently of an idler pulley.

LOUIS F. KOSS, Jr.

CERTIFICATE OF CORRECTION.

Patent No. 1,921,758.                                                  August 8, 1933.

LOUIS F. KOSS, JR.

It is hereby certified that error appears in the printed specification of the above numbered patent requiring correction as follows: Page 4, line 90, claim 9, strike out the words "edge contact with the flanges of" and insert the same before "said" first occurrence in line 91; and that the said Letters Patent should be read with this correction there in that the same may conform to the record of the case in the Patent Office.

Signed and sealed this 29th day of August, A. D. 1933.

M. J. Moore.

(Seal)                                               Acting Commissioner of Patents.

CERTIFICATE OF CORRECTION.

Patent No. 1,921,758.                                                                 August 8, 1933.

LOUIS F. KOSS, JR.

It is hereby certified that error appears in the printed specification of the above numbered patent requiring correction as follows: Page 4, line 90, claim 9, strike out the words "edge contact with the flanges of" and insert the same before "said" first occurrence in line 91; and that the said Letters Patent should be read with this correction there in that the same may conform to the record of the case in the Patent Office.

Signed and sealed this 29th day of August, A. D. 1933.

M. J. Moore.

(Seal)                                                                     Acting Commissioner of Patents.